United States Patent [19]

Schoenbeck

[11] Patent Number: 5,096,743

[45] Date of Patent: Mar. 17, 1992

[54] PROCESS FOR MAKING ROOFING MEMBRANE OF EPDM ELASTOMER AND ETHYLENE-CONTAINING POLYMER

[75] Inventor: Melvin A. Schoenbeck, Wilmington, Del.

[73] Assignee: E. I. Du Pont de Nemours and Company, Wilmington, Del.

[21] Appl. No.: 610,324

[22] Filed: Nov. 9, 1990

[51] Int. Cl.$^5$ ............................................... B05D 1/12
[52] U.S. Cl. ..................................... 427/189; 427/180
[58] Field of Search ................................. 427/180, 189

[56] References Cited

U.S. PATENT DOCUMENTS

| | | | |
|---|---|---|---|
| 2,611,721 | 9/1952 | Brees | 154/8 |
| 3,372,078 | 3/1968 | Fausti et al. | 156/306 |
| 3,834,932 | 9/1974 | Brandl | 156/60 X |
| 4,153,748 | 5/1979 | Bischoff | 428/57 |

Primary Examiner—Edith L. Buffalow
Attorney, Agent, or Firm—Craig H. Evans

[57] ABSTRACT

A process for curing a heat-weldable roofing membrane by applying elemental sulfur on the exterior surface of the roofing membrane, said membrane being a blend of (a) 50–80% by weight of an ethylene/propylene/non-conjugated diene elastomer and (b) 20–50% by weight of an ethylene-containing polymer selected from the group consisting of polyethylene, an ethylene alpha-monoolefin copolymer wherein the monoolefin contains from 3–12 carbon atoms and is present in amounts of 2–8% by weight, and an ethylene/vinyl acetate copolymer having a vinyl acetate content up to about 10% by weight, said membrane containing a cure accelerator. The roofing membrane is exposed to ambient outdoor temperatures resulting in migration of sulfur to the interior of the membrane where, together with the cure accelerator, it effects cure of the membrane.

11 Claims, No Drawings

PROCESS FOR MAKING ROOFING MEMBRANE OF EPDM ELASTOMER AND ETHYLENE-CONTAINING POLYMER

BACKGROUND OF THE INVENTION

This invention relates to a method for curing membranes with elemental sulfur wherein the membrane comprises a blend of an ethylene/propylene/nonconjugated diene elastomer (EPDM) and an ethylene-containing polymer which combines the properties of durability and seamability and is useful for covering roofs of building structures.

Thermoset EPDM elastomer compositions are very weather-resistant and they are used extensively as roofing membranes. However, the adhesive systems required to bond connecting sheets of the thermoset roofing provide only marginally adequate bond strength and they add significantly to the installation cost of the roofing membranes because of the labor required. The establishment of strong water-tight seams between adjacent sheets of roofing material is, of course, extremely important in such applications. The seams of the connecting sheets are often subjected to high winds, heavy rains, and snow and ice storms and they must be capable of withstanding the stresses generated by such adverse weather conditions. In addition, the seams of the connecting sheets used on flat roofs are further subjected to additional stress from the pooling of water, which often goes through alternating cycles of freezing and thawing. Finally, foot traffic across the roof covered with sheets of thermoset EPDM elastomers also contributes to considerable stress on the seams over the lifetime of the roofing membrane which may exceed 20 years.

Alternatively, thermoplastic EPDM compositions have been proposed for roofing membranes because they can be seamed rapidly by the application of heat and pressure. However, these compositions have not been used successfully because they soften excessively when exposed to direct sunlight during the warm weather months and thus require careful handling during installation and because they lack the toughness of cured sheets. Improving the hot strength of thermoplastic EPDM by blending it with other higher melting polymeric materials is only a partial solution to these problems. Although the hot strength of the blend is adequate for installation of the roofing membrane, the possibility of damage from foot traffic still exists each summer during hot weather.

Thus there is a need in the roofing membrane industry for a durable, heat seamable composition that does not require the application of adhesives containing organic solvents to the edges of the film or membrane to bond or seal the membranes.

SUMMARY OF THE INVENTION

The present invention is directed to a process for curing a heat-weldable roofing membrane which comprises applying of elemental sulfur on the exterior surface of the roofing membrane, said membrane being a blend of (a) 50–80% by weight, preferably 60–75% by weight, of an ethylene/propylene/non-conjugated diene elastomer and (b) 20–50% by weight, preferably 25–40% by weight, of an ethylene-containing polymer selected from the group consisting of polyethylene, ethylene alpha-monoolefin copolymers wherein the alpha-monoolefin contains 3–12 carbon atoms and is present in an amount of about 2–8% by weight, and ethylene/vinyl acetate copolymers having vinyl acetate contents up to about 10% by weight, said membrane containing a cure accelerator, exposing the roofing membrane to ambient temperatures so that the sulfur on the membrane migrates to the interior of the membrane and together with the accelerator results in cure of the membrane.

The EPDM elastomer can contain from 50–75% by weight ethylene, and preferably the elastomer contains from about 65–72% by weight ethylene. Preferably, the EPDM is a terpolymer of ethylene, propylene, and 1,4-hexadiene or ethylidene norbornene. Another preferred EPDM elastomer is a tetrapolymer of ethylene, propylene, 1,4-hexadiene and norbornadiene. To increase the rate and level of cure zinc oxide is usually present in the composition forming the membrane.

DETAILED DESCRIPTION OF PREFERRED EMBODIMENTS

The single membrane layer contains a blend of the EPDM elastomer and an ethylene-containing polymer and a cure accelerator. The blend of EPDM elastomer and ethylene-containing polymer must contain a cure accelerator for the EPDM elastomer. The membrane slowly cures in place by diffusion of the elemental sulfur into the polymer blend and contact with the cure accelerator with subsequent curing at ambient temperatures. The higher the air temperature to which the membrane is exposed on the roof, the faster the cure of the roofing membrane. For example, temperatures of about 70° C. for 30 days in an oven result in a cured, tough, durable membrane. It is normal for the surface temperatures of roofing membranes to reach temperatures of 70° C. or higher for substantial periods on sunny days during summer months. Elemental sulfur, the crosslinking agent for the elastomer, is applied on the exterior surface, i.e., the surface facing the elements, of the membrane. Elemental sulfur can be applied to the membrane as a powder or, preferably, in the form of a dispersion that can be sprayed, rolled, mopped or brushed on the exterior surface of the membrane after installation. The amount of elemental sulfur that is applied is that amount that will cause the EPDM elastomer to cure. Generally, amounts of elemental sulfur sufficient to cure the EPDM elastomer are from about 2–10 $g/m^2$, usually 4–7 $g/m^2$ membrane. The roofing membranes generally have a thickness of from about 0.8–2.0 mm, and preferably 1.0–1.5 mm.

The roofing membranes used in the process of this invention comprise a blend of EPDM elastomer and an ethylene-containing polymer. The EPDM that is present in the blend in amounts of from 50–80% by weight, preferably 60–75% by weight, can be any ethylene/propylene/diene terpolymer or tetrapolymer elastomer of the EPDM type. EPDM elastomers are copolymers of ethylene and propylene and a nonconjugated diene having one reactive double bond. They may, in addition, contain a minor amount of a second diene, which may have two reactive double bonds. The non-conjugated dienes of the first type include 1,4-hexadiene; 2-methyl-1,5 hexadiene; 1,9-octadecadiene; dicyclopentadiene; tricyclopentadiene; 5-ethylidene-2-norbornene; or 5-methylene-2-norbornene. Preferred dienes having one reactive double bond are 1,4-hexadiene and ethylidene norbornene. The non-conjugated dienes of the second type include norbornadiene; 1,4-pentadiene; 1,5-hexadiene; 1,7-octadiene; 1,20-heneicosadiene; or 5-(5-hexenyl)-2-norbornene, preferably norbornadiene. The EPDM elastomers which are suitable for use in the process of this invention contain about 50-75 weight percent of ethylene, preferably 65-72%, by weight and 1-6 weight percent of a diene or combination of dienes, the remainder being substantially propylene. The preferred EPDM elastomers are those which are highly crystalline and have ethylene contents of at least 65% to 75% by weight because such elastomers provide improved strength to the blended compositions while they are still uncured.

The polymer blend forming a single layer of the roofing membrane also contains from 20-50% by weight, preferably 25-40% by weight, of a second ethylene-containing polymer selected from the group consisting of (a) polyethylene, (b) ethylene/alpha-monoolefin copolymers wherein the alpha-monoolefin contains 3-12 carbon atoms, preferably 4-8 carbon atoms, and is present in an amount of from about 2-8% by weight and (c) ethylene/vinyl acetate copolymers containing up to 10% by weight vinyl acetate, usually 3-9% by weight. The polyethylene used in the blend can be any type, that is, high, low, or medium density polyethylene. Preferably, the polyethylene used has a density of from 0.92-0.94 g/cc. Representative ethylene/alpha-monoolefin copolymers include ethylene/propylene, ethylene/butene, ethylene/hexene, ethylene/octene, and ethylene/heptene. Ethylene/butene is preferred. The addition of the ethylene-containing polymers that are compatible with and incorporated in the EPDM elastomer raises the modulus of the elastomer and hence the strength of the elastomer. Usually, the uncured membranes of EPDM and ethylene-containing polymer have a modulus at 50% elongation of at least 1.4 MPa (200 psi) when measured in the transverse direction at 70° C.

Cure accelerators are incorporated into the elastomer blend compositions used to form the roofing membrane in amounts of from about 1-4 parts accelerator per 100 parts total polymer. Conventional accelerators that are used in curing systems for EPDM elastomers can be used in the present process. Representative accelerators include salts of dialkyldithiocarbamates such as zinc dibutyldithiocarbamate, zinc dimethyldithiocarbamate, zinc diethyldithiocarbamate, bismuth dibutyldithiocarbamate, copper dimethyldithiocarbamate, selenium diethyldithiocarbamate, lead dimethyldithiocarbamate, tellurium diethyldithiocarbamate, cadmium diethyldithiocarbamate and thiuram monosulfides such as tetramethylthiuram monosulfide and tetrabutylthiuram monosulfide.

The blend of EPDM elastomer and ethylene-containing polymer containing accelerator can contain, and preferably does contain, a vulcanization promoter that assists in further accelerating the cure of the EPDM elastomer when elemental sulfur migrates to the interior of the roofing membrane. The vulcanization promoters include benzothiazoles such as 2-mercaptobenzothiazole, benzothiazyl disulfide, and 2-mercaptothiazoline. These vulcanization promoters can be incorporated in the polymer blend in amounts of from about 0.5-3 parts per 100 parts total polymer.

Metal oxides are usually present in the blend of EPDM and ethylene-containing polymer. Representative metal oxides include zinc oxide, lead oxide, bismuth oxide, cadmium oxide and calcium oxide. Zinc oxide is almost always the metal oxide of choice because of its effectiveness and lack of toxicity. Usually such metal oxides are added to the polymer blend in amounts of from 2 to 10 parts/100 parts total polymer. Many accelerators and vulcanization promoters react with zinc oxide to form salts of even greater vulcanization activity. Zinc oxide itself acts as a vulcanization promoter, speeding the rate of reaction of elemental sulfur with the unsaturated cure sites in the EPDM elastomer.

Other ingredients such as low volatility paraffinic or naphthenic processing oils, such as Sunpar 2280 and Shellflex 790 can be incorporated in the polymer blend in conventional amounts, usually from 10-60 parts per 100 parts total polymer. Fillers such as carbon black and mineral fillers can be incorporated in the polymer blend in amounts usually from 50-200 parts per 100 parts total polymer.

The composition forming the roofing membrane, less, of course sulfur, can be formed by mixing all the ingredients together in a Banbury mixer. The membranes that are free from elemental sulfur can be formed by calendering processes or compression molding at temperatures between about 120°-160° C. The Mooney scorch value of the uncured roofing membrane usually is at least about 30 minutes to a 10 point rise measured at 150° C. using ASTM D-1646, small rotor. Also, usually the cure rate of the membrane with sulfur on the surface is such that it has a tensile strength at 70° C. of at least about 3.0 MPa and a modulus at 50% elongation of at least about 2.4 in the transverse direction after exposure in an oven heated to 70° C. for 30 days.

The following examples in which parts are by weight, unless otherwise indicated, further illustrate embodiments of the invention.

EXAMPLE 1

A polymer composition was prepared by mixing 65 parts of an EPDM elastomer (71 wt. % ethylene, 3.7 wt. % 1,4-hexadiene, and 0.9 wt. % norbornadiene, inherent viscosity 2.2), 35 parts of an ethylene/butene copolymer (94 wt. % ethylene, density 0.924 g/cc, melt index 4.0 dg/min.), 140 parts N774 carbon black, 30 parts Sunpar 2280 paraffinic oil, 0.2 part stearic acid, 3 parts zinc oxide in a Banbury mixer. The composition was dumped from the mixer when the temperature reached 140° C. 1 part mercaptobenzothiazole and 1 part zinc dibutyldithiocarbamate accelerator were subsequently incorporated in the composition on a 2-roll mill with the rolls heated to 130° C. This composition was calendered into a 1.14 mm thick membrane using calender roll temperatures of 130°-140° C. Membrane samples 8.3 cm × 12.7 cm were coated with a sulfur dispersion prepared by mixing 100 parts elemental sulfur, 30 parts of a 10% aqueous solution of Daxad 11, which is a dispersing agent consisting of sodium salts of polymerized alkyl naphthalene sulfonic acids, 30 parts of a 10% aqueous solution of ammonium caseinate, and 40 parts water. The dispersion was diluted 25% with water and applied with a brush to the membranes to provide test specimens containing varying levels of sulfur on their surfaces. The test specimens were dried for 30 minutes at 70° C. to evaporate the water. The amount of dried coating on the surface was determined by weight increase. The physical properties of the test specimens after being cured for 30 days at 70° C., which is the approximate temperature a black membrane on a flat roof experiences for several hours on sunny summer days, are shown in Table I. The original properties of the membrane are shown for comparison. Modulus, tensile strength, and elongation at break were determined according to ASTM D-412.

TABLE I

|  | Sample A | Sample B | Sample C | Original Properties |
|---|---|---|---|---|
| Coating Weight, g | 0.055 | 0.070 | 0.106 | — |
| Weight Sulfur, g | 0.049 | 0.063 | 0.095 | — |
| Sulfur, g/m² | 4.6 | 6.2 | 9.0 | — |
| Stress/Strain Properties in the Cross Machine. Direction @ 70° C. Samples Aged 30 Days @ 70° C. | | | | |
| $M_{50}$, MPa | 2.6 | 2.5 | 2.8 | 1.8 |
| $M_{100}$, MPa | 3.0 | 3.0 | 3.3 | 2.0 |
| $T_B$, MPa | 3.4 | 4.5 | 5.7 | 2.0 |
| $E_B$, % | 270 | 290 | 270 | 280 |

The values of tensile strength, modulus at 50% and 100% elongation, and elongation at break indicate that membrane samples of A, B, and C cured to form tough elastomeric compositions within 30 days at 70° C.

When the membranes are installed on a roof with the edges of the membranes overlaping, the overlaping edges can be securely bonded by heat-sealing in a conventional manner to form a water-tight seam. The sulfur dispersion is applied to the top surface after all seaming has been completed.

EXAMPLE 2

Three samples of the roofing membrane described in Example 1 were substantially evenly coated by application of powdered elemental sulfur in amounts of approximately 5 g/m². The coated membranes were mounted on 5 cm thick insulation board consisting of equal thicknesses of bonded fiber and rigid polyurethane foam. The membranes were exposed horizontally outdoors in an unshaded area in Delaware for a period of 12 weeks during the months of June through August, during which time the membranes would be at 70° C. or higher for several hours on sunny days.

Physical properties of the membrane after various periods of exposure are given below in Table II. Modulus, tensile strength, and elongation at break were determined according to ASTM D-412.

TABLE II

|  | Sample 2A | Sample 2B | Sample 2C |
|---|---|---|---|
| Sulfur, g/m² | 5.0 | 4.9 | 4.6 |
| Stress/Strain Properties in the Cross Machine Direction @ 70° C. | | | |
| After 4 Weeks | | | |
| $M_{50}$, MPa | 2.1 | | |
| $M_{100}$, MPa | 2.7 | | |
| $T_B$, MPa | 2.8 | | |
| $E_B$, % | 240 | | |
| After 8 Weeks | | | |
| $M_{50}$, MPa | | 2.3 | |
| $M_{100}$, MPa | | 2.8 | |
| $T_B$, MPa | | 3.7 | |
| $E_B$, % | | 250 | |
| After 12 Weeks | | | |
| $M_{50}$, MPa | | | 2.4 |
| $M_{100}$, MPa | | | 3.2 |
| $T_B$, MPa | | | 3.8 |
| $E_B$, % | | | 260 |

I claim:

1. A process for curing a heat-weldable roofing membrane which comprises applying elemental sulfur on the exterior surface of the roofing membrane, said membrane being a blend of (a) 50–80% by weight of an ethylene/propylene/nonconjuated diene elastomer and (b) 20–50% by weight of an ethylene-containing polymer selected from the group consisting of polyethylene, an ethylene alpha-monoolefin copolymers wherein the monoolefin contains from 3–12 carbon atoms and is present in amounts of 2–8% by weight, and an ethylene vinyl acetate copolymer having a vinyl acetate content up to about 10% by weight, said membrane containing a cure accelerator, exposing the roofing membrane to ambient temperatures so that the sulfur on the membrane migrates to the interior of the membrane and together with the cure accelerator results in cure of the membrane.

2. A process of claim 1 wherein said membrane is a blend of (a) 60–75% by weight of an ethylene/propylene/nonconjugated diene elastomer and (b) 25–40% by weight of an ethylene-containing polymer.

3. A process of claim 1 wherein the ethylene/propylene/diene elastomer contains 50–75% by weight ethylene units.

4. A process of claim 1 wherein the sulfur which is applied to the exterior surface of the roofing membrane is in the form of a powder.

5. A process of claim 1 wherein the sulfur which is applied to the exterior surface of the roofing membrane is in the form of a dispersion.

6. A process of claim 1 wherein the amount of sulfur applied to the membrane is from 2–10 g/m².

7. A process of claim 1 wherein the ethylene-containing polymer is an ethylene/butene copolymer.

8. A process of claim 1 wherein the ethylene-containing polymer is polyethylene.

9. A process of claim 1 wherein the accelerator is a dialkyldithiocarbamate.

10. A process of claim 9 wherein the dialkyldithiocarbamate is zinc dibutyldithiocarbamate.

11. A process of claim 1 wherein the ethylene/propylene/diene elastomer contains at least 65% by weight ethylene units.

* * * * *